Jan. 19, 1926.  1,570,247
I. J. HANDLEN
CONFECTIONERY MACHINE
Filed Jan. 11, 1924  2 Sheets-Sheet 1

Inventor
Irvin J. Handlen
By Clarence A. O'Brien
Attorney

Jan. 19, 1926. 1,570,247
I. J. HANDLEN
CONFECTIONERY MACHINE
Filed Jan. 11, 1924 2 Sheets-Sheet 2
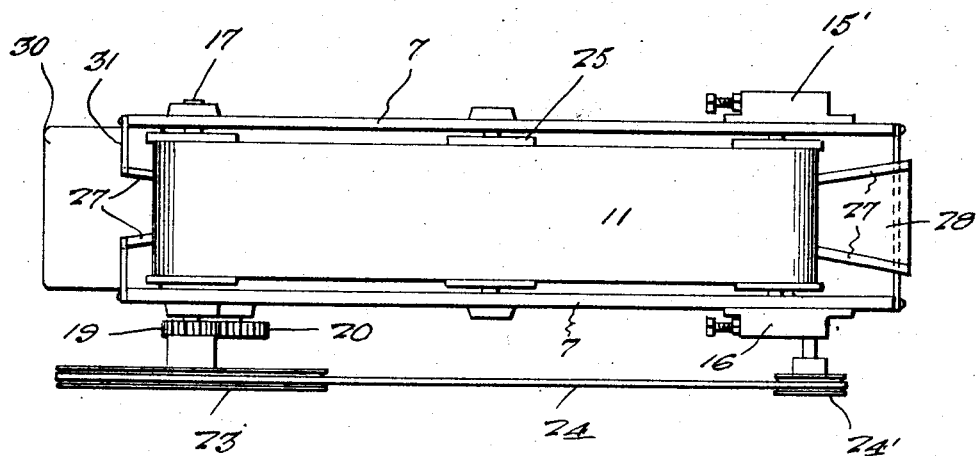
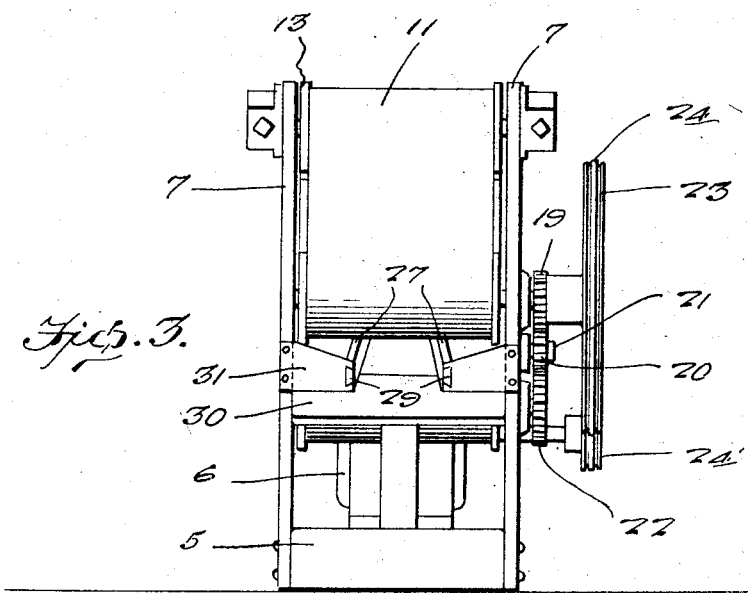
Inventor
Irvin J. Handlen
By Clarence A. O'Brien
Attorney Patented Jan. 19, 1926.

1,570,247

UNITED STATES PATENT OFFICE.

IRVIN J. HANDLEN, OF GREEN BAY, WISCONSIN.

CONFECTIONERY MACHINE.

Application filed January 11, 1924. Serial No. 685,680.

*To all whom it may concern:*

Be it known that I, IRVIN J. HANDLEN, a citizen of the United States, residing at Green Bay, in the county of Brown and State of Wisconsin, have invented certain new and useful Improvements in Confectionery Machines, of which the following is a specification.

This invention relates generally to the confectionery art and has more particular reference to a machine that is primarily adapted for use in the formation of candy bars of circular shape in cross section, the primary object of the invention residing in the provision of such a machine wherein circular candy bars may be formed in a quicker manner and with much better results than is now possible in the rolling of the same by hand.

An additional and important object of this invention resides in the provision of a machine of the above character wherein the same is of such a simple nature as to be employed by unskilled confectioners, and wherein the machine may be readily disassembled for cleaning, repair or renewal purposes.

With the foregoing salient objects in view, and others that will become apparent as the nature of the invention is better understood, the same comprises the novel form, combination and arrangement of parts of a machine hereinafter more fully described, shown in the accompanying drawings and claimed.

Figure 1:
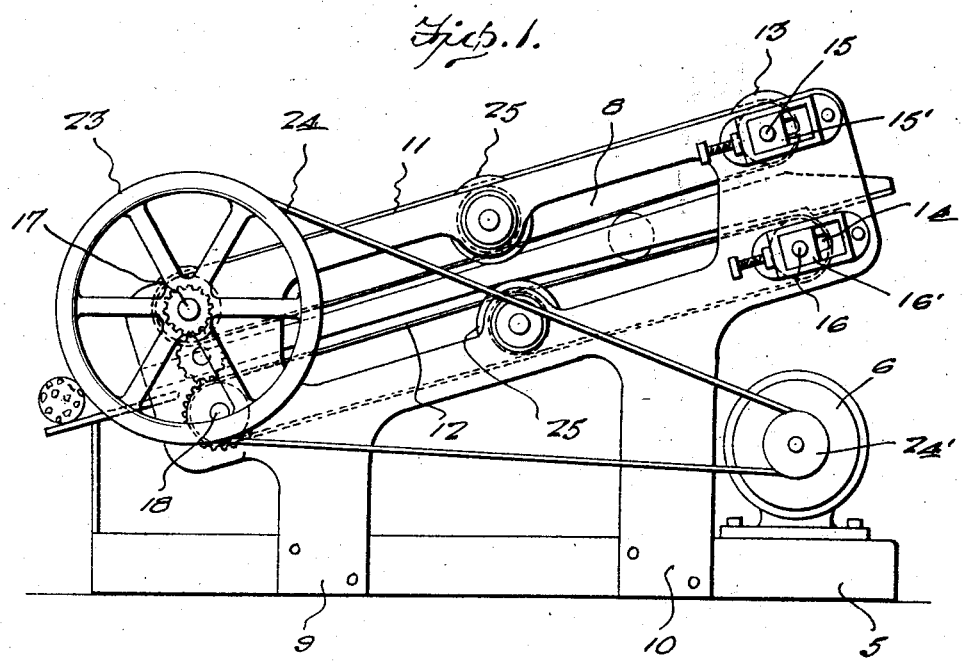
Figure 4:
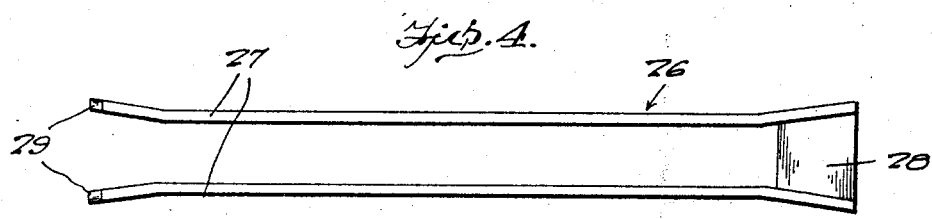
Figure 5:
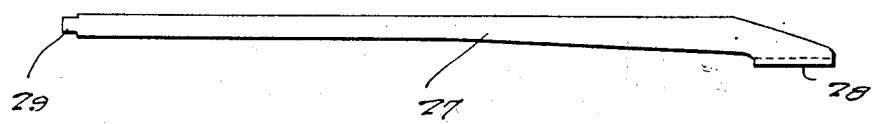

In the drawings wherein like reference characters indicate corresponding parts throughout the different views, Figure 1 is a side elevational view of a confectionery machine constructed in accordance with the present invention, Figure 2 is a top plan view thereof, Figure 3 is an elevation view of the delivery end of the machine, Figure 4 is a top plan view of the material guide member that forms an essential part of the present invention, and Figure 5 is a side elevational view thereof.

Now having particular reference to the drawings, a confectionery machine constructed in accordance with the present invention, includes a base 5 of relatively long and narrow configuration upon one end of which is supported a suitable form of electric motor 6.

The machine per se embodies the provision of a pair of side frame members 7—7 that are also relatively long and narrow and are formed with relatively large cut-out portions 8 for the purpose of lightness and cheapness. Each of these side frame members is formed adjacent its opposite ends with depending legs 9 and 10 of varying lengths. These legs are adapted to be rigidly secured to the opposite side edges of the base 5, it being of course noted that due to the variation in the length of these legs the side frame members 7—7 will be supported at an inclination with respect to the longitudinal plane of the base 5.

Between these side frame members 7—7 is an upper and lower endless belt 11 and 12 respectively, that are as clearly shown in Figure 1, disposed in spaced relationship with each other. The inclined ends of these belts are trained over flanged rollers 13 and 14, respectively, that are in turn carried by shafts 15 and 16, the ends of which are disposed in adjustable bearings 15'—15' and 16'—16' carried by the forward inclined ends of said side frame members 7—7.

The rear lower ends of these endless belts 11 and 12, are in turn trained over flanged rollers that are carried by shafts 17 and 18, respectively, but are journaled at their opposite ends in suitable bearings formed in said side frame members 7—7. Certain ends of these shafts 17 and 18 extend beyond the adjacent side frame members 7, the end of the uppermost shaft 17 being equipped with a spur gear 19 that is in mesh with a spur gear 20 loose upon a stub shaft 21, formed upon the adjacent side frame members 7. This loose gear 20 is in turn in mesh with a relatively larger spur gear 22 upon the end of the lowermost roller carrying shaft 18. The uppermost shaft 17 carries at its extreme end a relatively large pulley wheel 23 over which is trained an endless belt 24 that extends forwardly and is in turn trained over a small pulley 24' upon the end of the armature shaft of the motor 6, it being of course apparent that the relationship between the gears 22 and 19 is such that the uppermost endless belt 11 will move relatively faster than will said lowermost belt 12 for purposes presently to be set forth.

Disposed intermediate the ends of said side frame members 7—7 is a pair of flanged guide rollers 25—25 over which said belts 11 and 12 pass. These rollers obviously effecting guides for the belts and for preventing the same from sagging in the center during the operation of the machine.

It is preferable that the belts 11 and 12 at their lower discharge ends be more closely related than is the case with said belts at their inlet ends for obviously compensating for the gradual decreasing of the cross sectional area of the candy moving in a downward direction, which movement is obviously occasioned by the reverse movement of said belts as well as the higher speed of the uppermost belt 11.

Extended longitudinally between said belts 11 and 12, is a material guide designated generally by the reference character 26. This material guide comprises a pair of spaced parallel legs 27—27, the opposite ends of which are flared outwardly as clearly shown in Figure 4. Certain ends of the legs of this guide member are joined together by a cross web 28 while the opposite outwardly flaring ends of said legs are formed with dove-tail shaped lugs 29. This material guide is positioned in a manner as clearly shown in the side elevational view, Figure 1, it being noted that the connecting web 28 between the legs 27—27 of this guide serve as a receiving trough for the balls of candy to be formed into rolls by the action of the co-operating endless belts 11 and 12.

At the discharge end of the machine there is positioned a receiving table 30 that extends slightly inwardly between the side frame members 7—7, this plate being formed adjacent its inner end with a pair of inwardly extending ears 31 that are secured to the adjacent ends of the side frame members 7—7 through the medium of screws or other suitable fastening means, it being noted that the extreme inner ends of these ears are formed with dove-tailed shaped slots for receiving the before mentioned dove tail shaped lugs 29—29 upon the ends of the legs 27—27 of the material guide member 26 for obviously preventing any lateral movement of this guide member between the co-operating roll forming belts 11 and 12.

From the foregoing description when considered in conjunction with the accompanying drawings, it will be at once apparent to those skilled in the confectionery art, that I have provided a highly novel and simplified form of machine that is particularly adapted for use in the forming of candy rolls and one wherein as above stated, a great amount of these bars may be formed in a relatively short time, and this without requiring any great labor upon the part of the confectioner.

If desirable, a machine of this character may be equipped with a plurality of guide members of a type similar to that shown in the drawings, it being however noted that the leg members 27—27 of these different guides are spaced different distances apart for allowing rolls to be formed of varying lengths.

Minor changes may be made in the invention without departing from the spirit and scope of the appended claim.

Having thus described my invention, what I claim as new and desire to secure by Letters Patent is:—

A candy rolling machine including a frame, a pair of belts trained longitudinally in the frame in parallel spaced relation and on an incline, means for moving the belts, and a guide structure disposed between adjacent runs of the belts and comprising a pair of parallel side bars disposed in parallelism with the runs of the belts, the upper ends of said guide bars being flared outwardly from each other, and a plate formed integrally with the under edges of said upper ends, said lower ends being flared outwardly from each other and bracket arms extending inwardly from the frame and attached to said lower ends.

In testimony whereof I affix my signature.

IRVIN J. HANDLEN.